US009278451B2

(12) United States Patent
Kouno et al.

(10) Patent No.: US 9,278,451 B2
(45) Date of Patent: Mar. 8, 2016

(54) ROBOT SYSTEM AND METHOD FOR CONTROLLING ROBOT SYSTEM

(71) Applicant: KABUSHIKI KAISHA YASKAWA DENKI, Kitakyushu-shi (JP)

(72) Inventors: Dai Kouno, Kitakyushu (JP); Tamio Nakamura, Kitakyushu (JP); Takashi Suyama, Kitakyushu (JP); Takashi Nishimura, Kitakyushu (JP); Tomohiro Matsuo, Kitakyushu (JP); Shinichi Ishikawa, Kitakyushu (JP); Tomoki Kawano, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/207,656

(22) Filed: Mar. 13, 2014

(65) Prior Publication Data
US 2014/0277725 A1  Sep. 18, 2014

(30) Foreign Application Priority Data
Mar. 15, 2013  (JP) .................. 2013-052807

(51) Int. Cl.
*B25J 9/16* (2006.01)
*G05B 19/4061* (2006.01)

(52) U.S. Cl.
CPC ............ *B25J 9/1676* (2013.01); *B25J 9/1674* (2013.01); *G05B 19/4061* (2013.01); *G05B 2219/40202* (2013.01); *G05B 2219/40203* (2013.01)

(58) Field of Classification Search
CPC .......... B25J 9/1674; B25J 9/1676; B25J 9/06; F16P 3/14–3/148; F16P 3/00; G05B 2219/36473; G05B 2219/36399; G05B 2219/40202; G05B 2219/43202; G05B 9/4061; G05B 2219/40203
USPC ............................................................ 901/4
See application file for complete search history.

(56) References Cited

U.S. PATENT DOCUMENTS

| 4,697,979 | A |   | 10/1987 | Nakashima et al. |
| 5,363,474 | A | * | 11/1994 | Sarugaku et al. ............. 700/256 |

(Continued)

FOREIGN PATENT DOCUMENTS

| CN | 101018973 | 8/2007 |
| DE | 102005003827 | 7/2006 |

(Continued)

OTHER PUBLICATIONS

Japanese Office Action for corresponding JP Application No. 2013-052807, Sep. 30, 2014.

(Continued)

*Primary Examiner* — Khoi Tran
*Assistant Examiner* — Abby Lin
(74) *Attorney, Agent, or Firm* — Mori & Ward, LLP (57) ABSTRACT

A robot system of the present disclosure includes a robot and a controller configured to control motion of the robot, and the controller includes: a motion mode storage unit storing a plurality of motion modes for controlling the robot to switch a motion state of the robot from a normal motion state to a special motion state when a predetermined first condition is satisfied; and a motion mode switching unit configured to switch the motion mode of the robot to another motion mode when, while a particular motion mode stored in the motion mode storage unit is in execution, a predetermined second condition for the particular motion mode is satisfied with a first condition for the particular motion mode satisfied.

9 Claims, 5 Drawing Sheets

(56) References Cited

U.S. PATENT DOCUMENTS

| | | | |
|---|---|---|---|
| 6,212,443 B1 | 4/2001 | Nagata et al. | |
| 2008/0021597 A1* | 1/2008 | Merte et al. | 700/255 |

FOREIGN PATENT DOCUMENTS

| | | |
|---|---|---|
| JP | 60-160409 | 8/1985 |
| JP | 04-008495 | 1/1992 |
| JP | 09-150382 | 6/1997 |
| JP | 11-226889 | 8/1999 |
| JP | 2006-043861 | 2/2006 |
| JP | 4219870 B2 | 2/2006 |
| JP | 2010-167523 | 8/2010 |
| WO | 2010/054673 | 5/2010 |

OTHER PUBLICATIONS

Chinese Office Action for corresponding CN Application No. 201410015251.7, Jun. 30, 2015.

Henrich et al., "Modeling Intuitive Behavior for Safe Human/Robot Coexistence and Cooperation", IEEE International Conference on Robotics and Automation (ICRA), May 15, 2006, pp. 3929-3934, XP010921866.

Baerveldt, "Cooperation between Man and Robot: Interface and Safety", Robot and Human Communication, Sep. 1, 1992, pp. 183-187, XP010066651.

Extended European Search Report for corresponding EP Application No. 14157155.4-1807, Sep. 18, 2015.

* cited by examiner

ROBOT SYSTEM AND METHOD FOR CONTROLLING ROBOT SYSTEM

CROSS-REFERENCE TO RELATED APPLICATION

This application claims priority from Japanese Patent Application No. 2013-052807 filed with the Japan Patent Office on Mar. 15, 2013, the entire content of which is hereby incorporated by reference.

BACKGROUND

1. Technical Field

The present disclosure relates to a robot system and a method for controlling the robot system.

2. Related Art

Conventionally, a robot with an operable working arm has been suggested. In general, a safety fence is disposed around the working arm to separate an operation region for the working arm separated from an operation region for people. However, for example, a person may enter the safety fence to supply the work object. Further, in recent years, both the robot and the people have expanded opportunities to work together in a space where the operation regions for the working arm and the people are not separated. The use of the robot in such a circumstance may cause a risk that the robot and a person interfere with each other if the person enters the operation region for the working arm. A safety countermeasure has been built for avoiding such a risk. For example, a man•machine working system disclosed in Japanese Patent No. 4219870 includes a transmitter provided for a person, a receiver attached to a device to respond to the transmitter, and a position detector. The position detector detects the position of the person relative to the device by calculating an output signal from the receiver.

In the man•machine working system disclosed in Japanese Patent No. 4219870, the positional relation of the person to the device is detected by the position detector. Based on the positional relation, the operation region for people is set.

For example, a robot system according to JP-A-2010-167523 includes a human detection device for detecting the presence of a human within an operation region for an industrial robot.

The robot system according to JP-A-2010-167523 includes an electric supply adjusting device for adjusting the amount of current to be supplied to a robot control device. In this robot system, the electric supply adjusting device changes the amount of current in response to a signal output from the human detection device.

SUMMARY

A robot system of the present disclosure includes a robot and a controller configured to control motion of the robot, and the controller includes: a motion mode storage unit storing a plurality of motion modes for controlling the robot to switch a motion state of the robot from a normal motion state to a special motion state when a predetermined first condition is satisfied; and a motion mode switching unit configured to switch the motion mode of the robot to another motion mode when, while a particular motion mode stored in the motion mode storage unit is in execution, a predetermined second condition for the particular motion mode is satisfied with a first condition for the particular motion mode satisfied.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A robot system of an exemplary aspect of the present disclosure includes a robot and a controller configured to control motion of the robot, and the controller includes: a motion mode storage unit storing a plurality of motion modes for controlling the robot to switch a motion state of the robot from a normal motion state to a special motion state when a predetermined first condition is satisfied; and a motion mode switching unit configured to switch the motion mode of the robot to another motion mode when, while a particular motion mode stored in the motion mode storage unit is in execution, a predetermined second condition for the particular motion mode is satisfied with a first condition for the particular motion mode satisfied.

The robot may include a working arm, a base configured to support the working arm, and a moving mechanism for moving the base.

The robot system may further include a moving body detector that detects a position of a moving body other than the robot, the motion mode storage unit may store a first motion mode, and the first condition of this first motion mode may be that the moving body is detected within a predetermined area around the robot.

The special motion state of the first motion mode may be a state in which the robot is stopped.

The motion mode storage unit may store a second motion mode, the first condition of this second motion mode may be that a switch provided for the robot is on, and the special motion state of this second motion mode may be that the robot is allowed to follow an external force.

The motion mode storage unit may store a third motion mode, and the first condition of this third motion mode may be that a distance between the robot and the position of the moving body detected by the moving body detector is less than or equal to a predetermined distance.

The motion mode storage unit may store a fourth motion mode, the first condition of the fourth motion mode may be that the moving body is detected within the predetermined area around the robot, and the special motion state of the fourth motion mode is a special motion state in which the operation is made at lower power than normal.

The second condition of the first motion mode may be that the state in which the moving body is detected within the predetermined area around the robot has continued for a predetermined period or more, the motion mode switching unit may be configured to switch the motion mode of the robot from the first motion mode to the fourth motion mode when the second condition is satisfied during the execution of the first motion mode, the first condition of the fourth motion mode may be that the moving body is detected within the predetermined area around the robot, and the special motion state of the fourth motion mode may be a special motion mode in which the operation is made at lower power than normal.

The second condition of the fourth motion mode may be that the moving body is not detected within the predetermined area around the robot, and the motion mode switching unit may be configured to switch the motion mode of the robot from the fourth motion mode to the first motion mode when the second condition is satisfied during the execution of the fourth motion mode.

The second condition of the first motion mode may be that a switch (enable switch) provided for the robot is on, the motion mode switching unit may be configured to switch the motion mode of the robot from the first motion mode to the second motion mode when the second condition is satisfied during the execution of the first motion mode, the first condition of the second motion mode may be that the switch (enable switch) is on, and the special motion state of the second motion mode may be that the robot is allowed to follow an external force.

The second condition of the third motion mode may be that the robot is in a stopped state and a switch (enable switch) provided for the robot is on, the motion mode switching unit may be configured to switch the motion mode of the robot from the third motion mode to the second motion mode when the second condition is satisfied during the execution of the third motion mode, the first condition of the second motion mode may be that the switch (enable switch) is on, and the special motion state of the second motion mode may be that the robot is allowed to follow an external force.

The second condition of the third motion mode may be that the robot is in a stopped state and the state in which the moving body is detected within the predetermined area around the robot has continued for a predetermined period or more, the motion mode switching unit may be configured to switch the motion mode of the robot from the third motion mode to the fourth motion mode when the second condition is satisfied during the execution of the third motion mode, the first condition of the fourth motion mode may be that the moving body is detected within the predetermined area around the robot, and the special motion state of the fourth motion mode may be a special motion state in which the operation is made at lower power than normal.

A method for controlling a robot system of another exemplary aspect of the present disclosure includes: executing a particular motion mode among a plurality of motion modes for controlling a robot when a predetermined first condition is satisfied, so that a motion state of the robot is switched from a normal motion state to a special motion state; and switching the motion mode to another motion mode when, while the particular motion mode is in execution, a predetermined second condition of the particular motion mode is satisfied with a first condition for the particular motion mode satisfied.

Other objects and characteristics of the present disclosure will be made apparent from the embodiments to be described below with reference to the attached drawings.

With a robot system and a method for controlling the robot system according to the present disclosure, the safety is further improved.

First Embodiment

Figure 1:
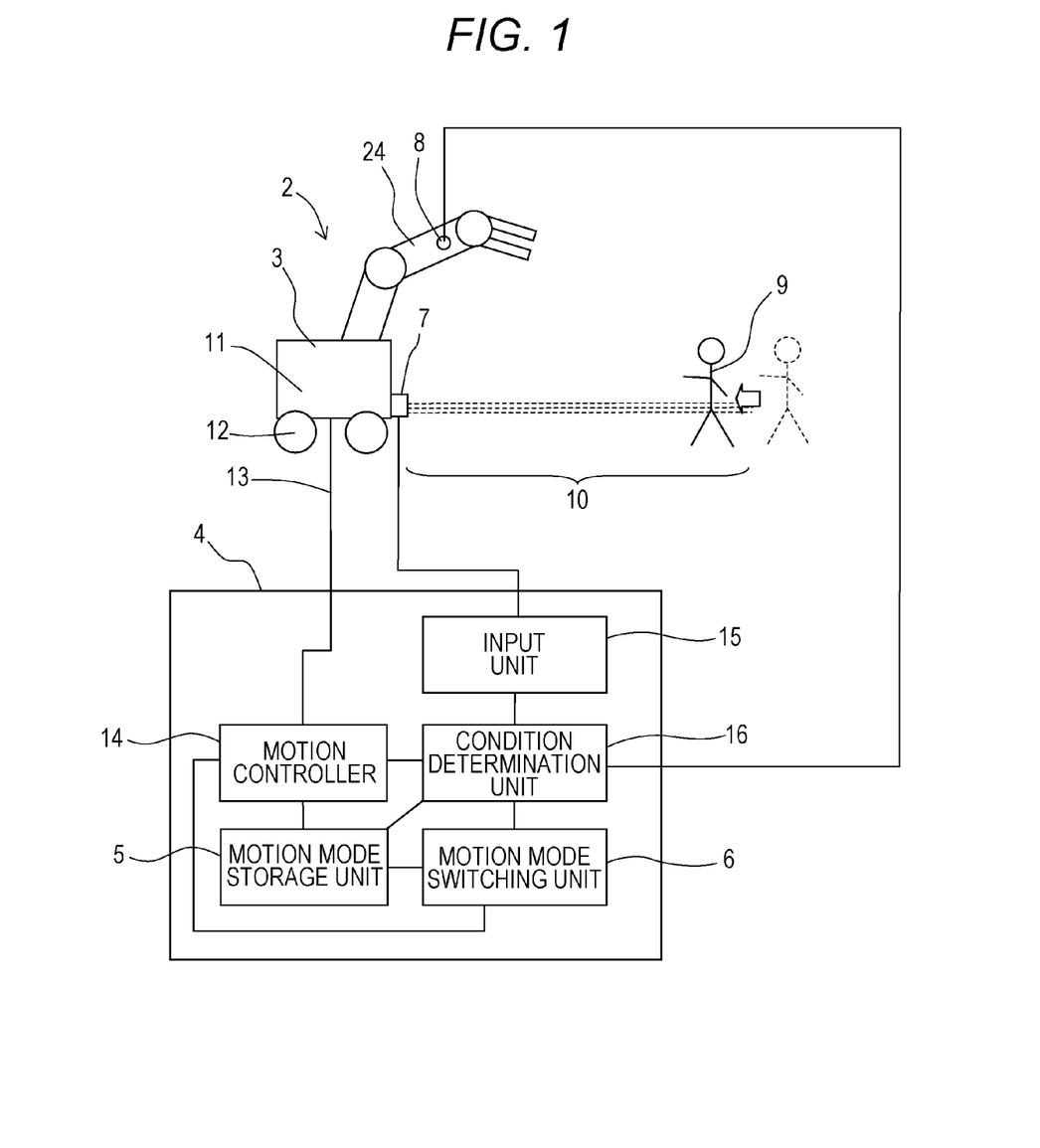
FIG. 1 is a schematic diagram illustrating an operation of a robot system according to a first embodiment.
Figure 2:
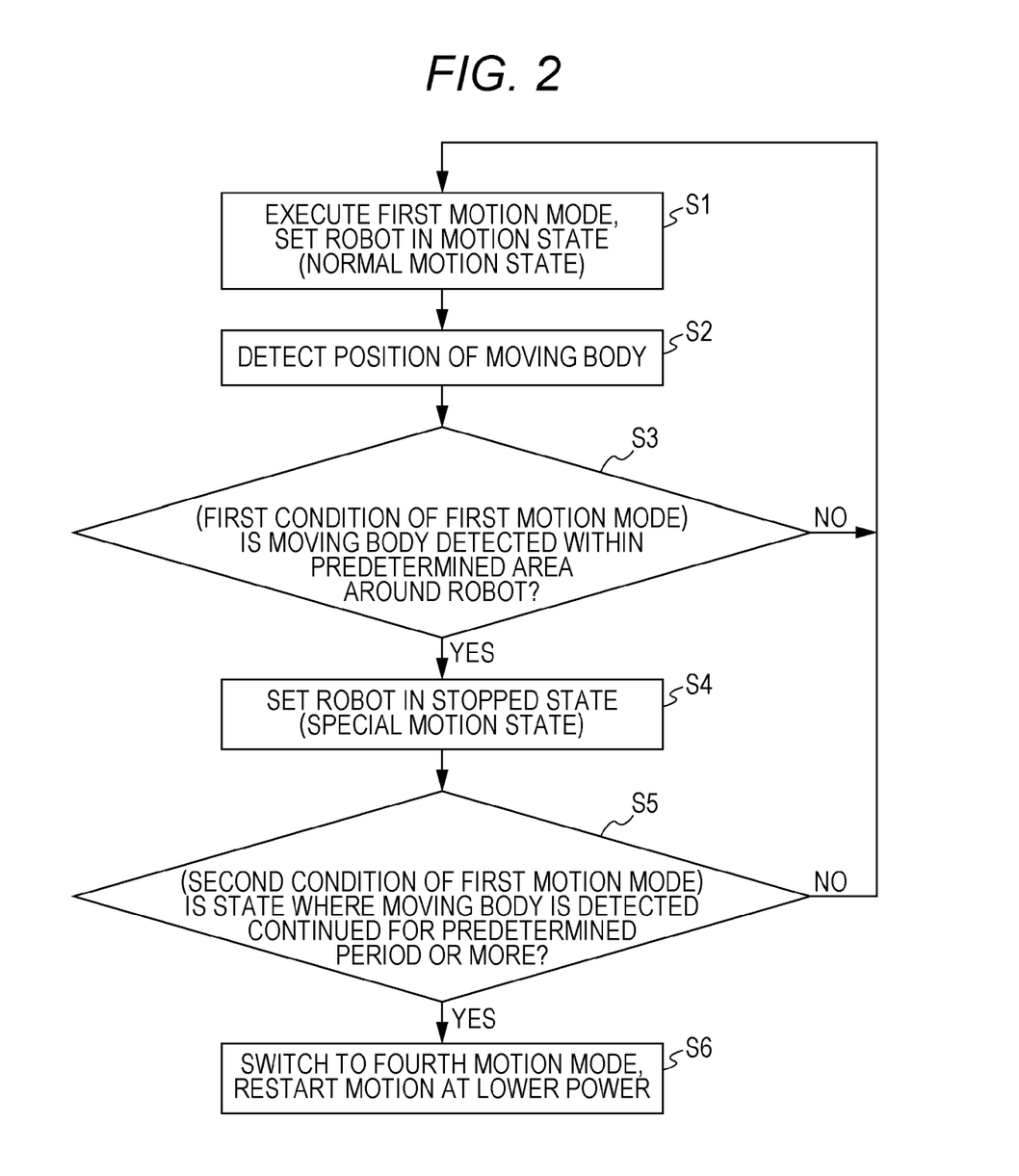
FIG. 2 is a flowchart illustrating the procedure for switching a motion mode of the robot system according to the first embodiment.

A robot system according to a first embodiment is hereinafter described with reference to drawings. FIG. 1 is a schematic diagram illustrating the motion of the robot system according to the first embodiment. FIG. 2 is a flowchart illustrating the procedure for switching the motion mode in the robot system according to the first embodiment.

A robot system 2 illustrated in FIG. 1 includes a robot 3 and a controller 4 for controlling the motion of the robot 3. The controller 4 includes a motion mode storage unit 5 and a motion mode switching unit 6. The motion mode storage unit 5 stores a plurality of motion modes for controlling the robot 3. During the execution of the motion mode, if a first condition thereof, which is set in advance, is satisfied, the motion state of the robot 3 is switched from the normal motion state to a special motion state. In other words, the motion mode controls the robot 3 so that the motion state of the robot 3 is switched from the normal motion state to a special motion state if the first condition set in advance is satisfied. The motion mode switching unit 6 switches the motion mode to be executed. For example, it is assumed that a certain motion mode is in execution and a first condition thereof is satisfied. In this case, if a second condition of this motion mode, which is set in advance, is satisfied, the motion mode switching unit 6 switches the motion mode of the robot 3 to another motion mode. With the robot system 2 as above, the safety can be improved further. In other words, by setting the condition as above, the motion mode of the robot 3 is switched to another motion mode which is suitable for the robot 3 and the circumstances around the robot 3. This improves the safety further. Since the restriction on the speed and the motion of the robot 3 is suppressed, the takt time is shortened. As a result, the productivity and the rate of motion of the robot system 2 are improved.

The robot 3 has a working arm 24, a base 11 that supports the working arm 24, and a moving mechanism 12 that moves this base 11. As illustrated in FIG. 1, the base 11 supports one working arm 24. The robot 3 may have two or more working arms 24 depending on the activity. FIG. 1 also illustrates an example of the robot 3 having the moving mechanism 12 that moves the base 11. The base 11 may be fixed to an installation surface (for example, floor) with an anchor bolt or the like, which is not shown. The robot 3 is provided with an enable switch 8. The enable switch 8 is turned on by being pressed. Then, the motion of the robot 3 is allowed to follow an external force while the enable switch 8 is on. The enable switch 8 may be configured to be turned off when the switch is released from the pressed state, like a so-called dead man's switch. Alternatively, the enable switch 8 may be configured to be turned off when the switch in the pressed state is pressed down further.

The controller (robot controller) 4 controls the motion of a part of the robot 3 to be driven. The controller 4 includes, for example, a CPU, a ROM, a RAM, and the like. The robot 3 and the controller 4 are connected to each other via a cable 13 in a manner that the communication therebetween is possible. Note that the robot 3 and the controller 4 may alternatively be connected to each other wirelessly. The controller 4 illustrated in FIG. 1 includes the motion mode storage unit 5, the motion mode switching unit 6, a motion controller 14, an input unit 15, and a condition determination unit 16.

The motion controller 14 controls the motion of the robot 3 or the working arm 24. The motion controller 14 outputs a motion order to an actuator (servomotor, etc.) of the working arm 24 according to a motion program taught in advance. On the other hand, the motion controller 14 monitors the positional information of the actuator, for example, and controls the working arm 24 so that the working arm 24 operates based on the motion order. The motion controller 14 controls so that the motion state of the robot 3 is switched based on the switching of the motion mode to be described later.

Additionally, the controller 4 has a storage unit. The storage unit stores the motion program and the parameters for the control. Note that FIG. 1 does not illustrate the storage unit.

The robot 3 normally operates at a speed specified by the motion program taught in advance.

The motion mode storage unit 5 is a database storing a plurality of motion modes for controlling the robot 3. The controller 4 executes the motion mode stored in the motion mode storage unit 5. The controller 4 switches the motion state of the robot 3 from the normal motion state to a special motion state when the predetermined first condition of the motion mode in execution is satisfied. Here, the normal motion state refers to the normal motion state of the motion mode in execution. The special motion state refers to other motion state than the normal motion state of the motion mode. The first condition varies depending on the motion mode. The special motion state serving as a motion state of the robot 3 when the first condition is satisfied also varies depending on the motion mode. For example, in at least one of the motion modes, the first condition may be that the moving body 9 is detected within a predetermined area 10 around the robot 3.

While a particular motion mode is in execution, the motion mode switching unit 6 switches the particular motion mode to another motion mode stored in the motion mode storage unit 5. If a second condition set in advance of the particular motion mode is satisfied with the first condition of the particular motion mode satisfied, the motion mode switching unit 6 switches the particular motion mode to another motion mode. In each motion mode, the first condition and the second condition are set in advance. The first condition triggers the switching over to the special motion state from the normal motion state. The second condition triggers the switching over to another motion mode from the motion mode executed currently. First, the condition determination unit 16 receives the information of the robot 3 and the information of the circumstances around the robot 3 from the input unit 15. Based on the information, the condition determination unit 16 determines whether both the first condition and the second condition of the motion mode currently executed are satisfied. When both the first condition and the second condition are satisfied, the motion mode switching unit 6 selects a motion mode different from the motion mode currently executed, from among the plural motion modes stored in the motion mode storage unit 5. Thus, the motion mode of the robot 3 can be changed.

The condition determination unit 16 determines the condition as to whether the first condition and the second condition of the motion mode currently executed are satisfied or not. When the first condition is satisfied, the condition determination unit 16 outputs the determination result to the motion controller 14. When both the first condition and the second condition are satisfied, the condition determination unit 16 outputs the determination result to the motion mode switching unit 6. The motion controller 14 controls the robot 3 by executing the motion mode stored in the motion mode storage unit 5. Upon the reception of the output representing that the first condition is satisfied from the condition determination unit 16, the motion controller 14 controls the robot 3 so that the motion state of the robot 3 is switched from the normal state to the special motion state of the motion mode currently executed. As described above, upon the reception of the output representing that both the first condition and the second condition are satisfied, the motion mode switching unit 6 switches the motion mode into a motion mode different from the motion mode currently executed. The motion controller 14 controls the robot 3 by additionally executing the different motion mode.

As illustrated in FIG. 1, the robot system 2 may have a moving body detector 7 that detects the position of the moving body 9 other than the robot 3. The moving body 9 other than the robot 3 corresponds to, for example, a human, a hand lift, a conveyer truck, or a self-running robot other than the robot 3. In particular, the moving body 9 may be a human or a human-power traveling body. If the moving body 9 as the detection target is the one moving on the floor, the moving body detector 7 such as a laser ranging device may be disposed at a predetermined height from the floor as illustrated in FIG. 1 to detect the position of the moving body 9 at the predetermined height. The moving body detector 7 is not limited to the laser ranging device. The moving body detector 7 may be, for example, a photographing device or a data receiving device for reading data from an IC tag provided for the moving body 9. The moving body detector 7 outputs the detection result for the moving body 9 to the input unit 15 of the controller 4. The input unit 15 receives various kinds of information used for the condition determination in the condition determination unit 16, and outputs the information to the condition determination unit 16. The robot system 2 may further include another detector (not shown) in addition to the moving body detector 7 for detecting the information used for the condition determination in the condition determination unit 16.

FIG. 2 is a flowchart illustrating the procedure for switching the motion mode in the robot system 2 as above. In the robot system 2 according to the first embodiment, the first motion mode is executed in Step S1. The first condition of the first motion mode is that the moving body 9 is detected within the predetermined area 10 around the robot 3. The special motion state of the first motion mode corresponds to a state in which the robot 3 is stopped. In other words, in the first motion mode, the robot 3 is stopped when the first condition is satisfied in which: the moving body 9 has been detected within the predetermined area 10 around the robot 3. It is assumed that the first condition is not satisfied at the start of the flowchart. The initial motion state of the robot 3 is the motion state (i.e., the normal motion state). The second condition of the first motion mode is that the state in which the moving body 9 is detected in the predetermined area 10 around the robot 3 has continued for a predetermined period or more. The range of the predetermined area 10 can be set as appropriate depending on the work during the execution of the first motion mode.

Next, in Step S2, the moving body detector 7 detects the position of the moving body 9. The detection result for the position of the moving body 9 is used for the condition determination for the first condition of the first motion mode and the condition determination for the second condition. Next, in Step S3, the condition determination unit 16 determines whether the moving body 9 is detected within the predetermined area 10 around the robot 3. When the moving body 9 is detected within the predetermined area 10 around the robot 3, the process advances to Step S4 where the motion controller 14 causes the robot 3 in the stopped state, i.e., the special motion state. The stop of the robot 3 suppresses the interference between the robot 3 and the moving body 9 having entered the predetermined area 10. This improves the safety of the robot system 2. When the moving body 9 is not detected within the predetermined area 10 around the robot 3, the process returns to Step S1 where the motion controller 14 maintains the normal motion state of the first motion mode. This improves the productivity and the rate of motion of the robot system 2.

Next, the process advances to Step S5 where the condition determination unit 16 carries out the condition determination for the second condition of the first motion mode. In other words, the condition determination unit 16 determines whether the state in which the moving body 9 is detected within the predetermined area 10 around the robot 3 has continued for a predetermined period or more. In other words, the moving body detector 7 checks (detects) the position of the moving body 9 at predetermined time intervals. The condition determination unit 16 measures (counts) the time for which the moving body 9 is present within the predetermined area 10. By comparing the measured time and the predetermined period, the condition determination unit 16 determines whether the second condition is satisfied or not. During the condition determination for the second condition, the robot 3 remains in the stopped state. If the moving body 9 is no longer detected within the predetermined area 10 before the predetermined period has passed, however, the condition determination unit 16 resets the measurement (count) and the process returns to Step S1. In Step S1, the motion controller 14 restarts the motion state of the first motion mode. Meanwhile, if the state in which the moving body 9 is detected within the predetermined area 10 has continued for the predetermined period or more, the motion mode switching unit 6 switches the motion mode of the robot 3 from the first motion mode to the fourth motion mode in Step S6. The first condition of the fourth motion mode is that the moving body 9 is detected within the predetermined area 10 around the robot 3. The special motion state in the fourth motion mode is that the robot 3 is operated at lower power than normal.

A specific example of "the operation at lower power than normal" is that the maximum power of the servomotor driving the joint of the robot 3 is restricted to be lower than in the case where the moving body 9 is not detected.

In other words, the motion mode switching unit 6 switches the motion mode of the robot 3 from the first motion mode in which the special motion state is the stop state to the fourth motion mode in which the operation is made at lower power than normal if the first condition is satisfied. Thus, the motion controller 14 restarts the motion of the robot 3. If the state in which the moving body 9 is detected has continued for the predetermined period or more, it means that the moving body 9 has known sufficiently the circumstances around the robot 3 including the status of the moving body 9 itself. Therefore, the state in which the moving body 9 is detected has continued for the predetermined period or more serves as the second condition of the first motion mode. When the second condition is satisfied, the motion mode transits to the fourth motion mode and the motion of the robot 3 is restarted. Here, in the fourth motion mode, when the first condition of the fourth motion mode is satisfied, the robot 3 operates at lower power than normal. The switching over to the fourth motion mode from the first motion mode is made under the condition that the first condition of the fourth motion mode is satisfied. As a result, in the fourth motion mode after the switch, the robot 3 restarts the operation at lower power, which is the special motion state. When the robot 3 restarts the operation at lower power, the influence on the moving body 9 is reduced. If the state in which the moving body 9 is detected has continued for less than the predetermined period, the stop state of the robot 3 in Step S4 is maintained. The time for satisfying the second condition of the first motion mode is not limited in particular. For example, this time can be set as appropriate depending on the range of the predetermined area 10 or the work to be executed by the first motion mode.

As thus described, in the robot system 2 according to the first embodiment, when the moving body 9 gets closer to the robot 3 working in the normal motion state, the robot 3 stops once. If the moving body 9 goes away from the robot 3 in a predetermined period after that, the robot 3 restarts the work in the same motion state. On the other hand, if the state in which the moving body 9 is close to the robot 3 has continued for a predetermined period or more, the mode in which the robot 3 is operated at low power is executed and the robot 3 restarts the work. As long as the robot 3 operates at low power, the contact between the robot 3 and the moving body 9 can suppress the impact on the moving body 9.

In other words, the robot system according to the first embodiment can achieve both the high productivity and rate of operation, and the high safety.

Second Embodiment

Figure 3:
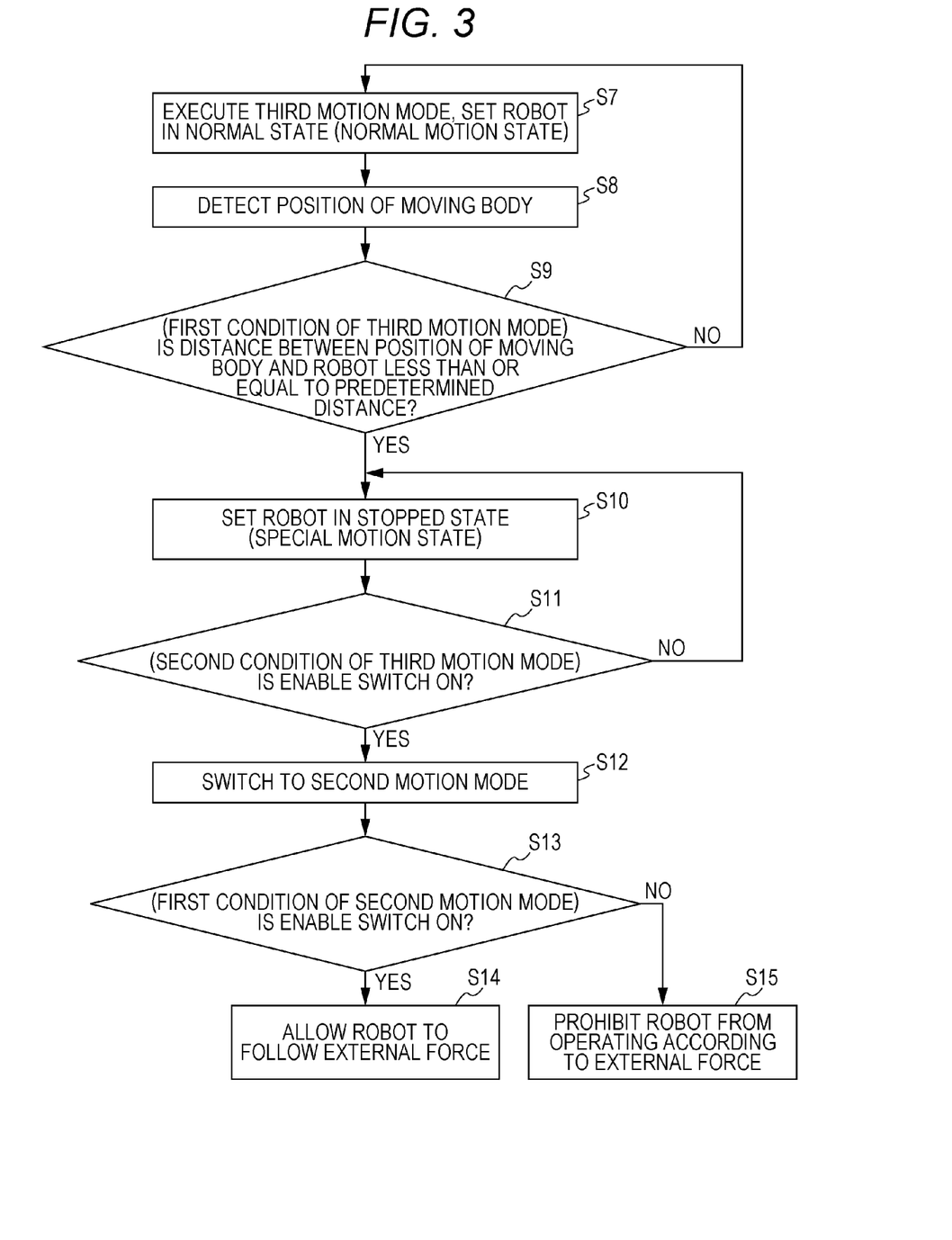
FIG. 3 is a flowchart illustrating the procedure for switching a motion mode of a robot system according to a second embodiment.

FIG. 3 is a flowchart illustrating the procedure for switching the motion mode in a robot system according to a second embodiment. In the robot system according to the second embodiment, the motion controller 14 executes the third motion mode in Step S7. The first condition of the third motion mode is that the distance between the moving body 9 and the robot 3 is less than or equal to a predetermined distance. It is assumed that the first condition is not satisfied at the start of the flowchart. The robot 3 is in the operation, i.e., the normal motion state. The second condition of the third motion mode is that the robot 3 is in the stopped state and the enable switch 8 (hereinafter may be referred to as "switch" simply) provided for the robot 3 is on. The distance between the moving body 9 and the robot 3 in the first condition can be set as appropriate depending on the work executed by the robot 3 in the third motion mode.

Next, in Step S8, the moving body detector 7 detects the position of the moving body 9. The detection of the position of the moving body 9 is used for the condition determination for the first condition of the third motion mode. In Step S9, next, the condition determination unit 16 determines whether the distance between the moving body 9 and the robot 3 is less than or equal to the predetermined distance. In the case where the distance between the moving body 9 and the robot 3 is less than or equal to the predetermined distance, the motion controller 14 causes the robot 3 to be in the special motion state (for example, stopped state) in Step S10. Even when the moving body 9 gets too close to the robot 3, the interference between the moving body 9 and the robot 3 can be suppressed by stopping the robot 3. This improves the safety of the robot system. When the distance between the moving body 9 and the robot 3 is greater than or equal to the predetermined distance, the process returns to Step S7 where the normal motion state of the third motion mode is maintained. This improves the productivity and rate of motion of the robot system.

Next, in Step S11, the motion controller 14 conducts the condition determination for the second condition of the third motion mode. In other words, in Step S11, the motion controller 14 determines whether the enable switch 8 provided for the robot 3 is on or not. The second condition of the third motion mode includes the state in which the robot 3 is stopped. In the robot system according to the second embodiment, however, the special motion state of the robot 3 when the first condition of the third motion mode is the state in which the robot 3 is stopped. Therefore, in the flowchart illustrated in FIG. 3, the determination as to whether the robot 3 is in the stopped state or not is omitted. For example, if the special motion state of the robot 3 when the first condition of the third motion mode is satisfied is the state other than the state in which the robot 3 is stopped, the motion controller 14 may determine whether the robot 3 is in the stopped state or not at the condition determination for the second condition of the third motion mode. If the enable switch 8 of the robot 3 is on, the motion mode switching unit 6 switches the motion mode from the third motion mode to the second motion mode in Step S12. The first condition of the second motion mode is that the enable switch 8 is on. The special motion state of the second motion mode is that the robot 3 is allowed to follow the external force. In other words, in the third motion mode, the motion of the robot in the stopped state as the special motion state is not allowed to follow the external force. The motion of the robot 3 can follow the external force if the motion mode of the robot is switched to the second motion mode and the first condition of the second motion mode is satisfied.

In the flowchart of FIG. 3, after the motion mode of the robot 3 is switched to the second motion mode, the condition determination unit 16 determines whether the enable switch 8 of the robot 3 is on or not again in Step S13. This condition determination corresponds to the condition determination for the first condition of the second motion mode. If the enable switch 8 is on, the motion controller 14 allows the robot 3 allowed to follow the external force in Step S14. Therefore, if the enable switch 8 satisfies the second condition of the third motion mode is satisfied, or the enable switch 8 is on, the movement of the motion of the robot 3 can follow the external force when the motion mode of the robot 3 is switched to the second motion mode. If the enable switch 8 is turned off after the motion mode of the robot 3 is switched to the second motion mode, the motion of the robot 3 following the external force in Step S15 is suppressed.

As thus described, in the robot system according to the second embodiment, when the moving body 9 gets closer to the robot 3 working in the normal motion state, the robot 3 is stopped once. After that, when the enable switch 8 is turned on, the robot 3 allowed to follow the external force.

In the case where the moving body 9 is a person, the robot 3 can be moved to desired position and posture when the person applies an external force to the robot 3 while the enable switch 8 is maintained to be on. Further, so-called direct teaching can be executed by recording the state of the robot 3 in the storage unit (not shown) in the controller 4.

In the direct teaching, the motion program is taught to the robot 3 in the following manner. In other words, by application of the force to the robot 3 from the person, the robot 3 is moved to the desired position or posture; this state is recorded.

In other words, in the robot system according to the second embodiment, a series of steps as follows can be performed smoothly without a complicated procedure: getting closer to the robot 3 working in the normal motion state; and correcting the motion program of the robot 3 through the direct teaching. The second condition of the first motion mode described in the first embodiment may be that the enable switch 8 of the robot 3 is on. In this case, the motion mode switching unit 6 may be configured to switch the motion mode of the robot 3 from the first motion mode to the second motion mode when the second condition is satisfied while the first motion mode is executed. The first condition of the second motion mode is that the enable switch 8 is on. The special motion state of the second motion mode is that the robot 3 is allowed to follow the external force. The second condition of the third motion mode may be that the state in which the robot 3 is stopped and the state in which the moving body 9 is detected within the predetermined area 10 around the robot 3 has continued for a predetermined period or more. In this case, the motion mode switching unit 6 may be configured to switch the motion mode of the robot 3 from the third motion mode to the fourth motion mode when the second condition is satisfied while the third motion mode is executed. The first condition of the fourth motion mode is that the moving body 9 is detected within the predetermined area 10 around the robot 3. The special motion state of the fourth motion mode corresponds to the special motion state in which the robot 3 operates at lower power than normal.

Third Embodiment

Figure 4:
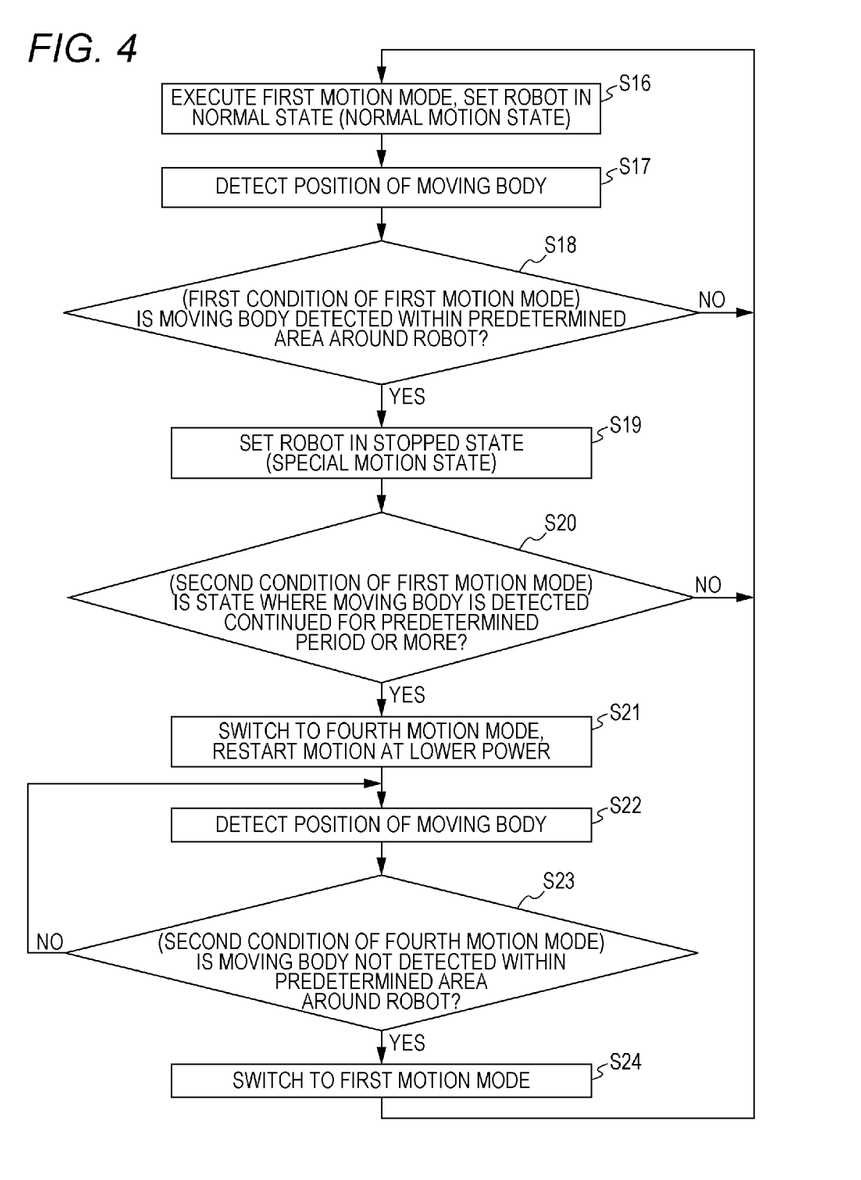
FIG. 4 is a flowchart illustrating the procedure for switching a motion mode of a robot system according to a third embodiment.

FIG. 4 is a flowchart illustrating the procedure for switching the motion mode of a robot system according to a third embodiment. In the robot system according to the third embodiment, the motion controller 14 executes the first motion mode in Step S16. The first condition of the first motion mode is that the moving body 9 is detected within the predetermined area 10 around the robot 3. The special motion state of the first motion mode corresponds to the state in which the robot 3 is stopped. It is assumed that the first condition is not satisfied at the start of the flowchart. The initial motion state of the robot 3 corresponds to the motion state, i.e., the normal motion state. The second condition of the first motion mode is that the state in which the moving body 9 is detected within the predetermined area 10 around the robot 3 has continued for a predetermined period or more. When the second condition of the first motion mode is satisfied, the motion mode switching unit 6 switches the motion mode of the robot 3 from the first motion mode to the fourth motion mode. Note that this first motion mode is the same as the first motion mode described in the robot system 2 according to the first embodiment. The procedure for switching the motion mode of the robot 3 from the first motion mode to the fourth motion mode by the motion mode switching unit 6 when the second condition of the first motion mode is satisfied is also the same as the procedure described in the robot system 2 according to the first embodiment. The robot system according to the third embodiment further includes the switching step in which the motion mode switching unit 6 switches the motion mode of the robot 3 from the fourth motion mode to the first motion mode again if the second condition of the fourth motion mode is satisfied after the motion mode is switched to the fourth motion mode.

As illustrated in FIG. 4, in the robot system according to the third embodiment, the motion controller 14 first executes the first motion mode in Step S16. As described above, the first condition of the first motion mode is that the moving body 9 is detected within the predetermined area 10 around the robot 3. If this first condition is satisfied, the motion controller 14 switches the motion state of the robot 3 to the stopped state. Next, in Step S17, the moving body detector 7 detects the position of the moving body 9. Next, in Step S18, the condition determination unit 16 determines whether the moving body 9 is detected within the predetermined area 10 around the robot 3. If the moving body 9 is detected within the predetermined area 10 around the robot 3, the process advances to Step S19 where the motion controller 14 causes the robot 3 in the stopped state, i.e., the special motion state. Moreover, if the moving body 9 is not detected within the predetermined area 10 around the robot 3, the process returns to Step S16 where the motion controller 14 maintains the normal motion state of the first motion mode.

Next, the process advances to Step S20 where the condition determination unit 16 carries out the condition determination for the second condition of the first motion mode. In other words, the condition determination unit 16 determines whether the state in which the moving body 9 is detected within the predetermined area 10 around the robot 3 has continued for a predetermined period or more. In other words, the moving body detector 7 checks (detects) the position of the moving body 9 at predetermined time intervals. The condition determination unit 16 measures (counts) the time for which the moving body 9 is present within the predetermined area 10. By comparing the measured time and the predetermined period, the condition determination unit 16 then determines whether the second condition is satisfied or not. During the condition determination for the second condition, the robot 3 remains in the stopped state. If the moving body 9 is no longer detected within the predetermined area 10 before the predetermined period has passed, however, the condition determination unit 16 resets the measurement (count) and the process returns to Step S16. In Step S16, the motion controller 14 restarts the motion state of the first motion mode. Meanwhile, if the state in which the moving body 9 is detected within the predetermined area 10 has continued for the predetermined period or more, the motion mode switching unit 6 switches the motion mode of the robot 3 from the first motion mode to the fourth motion mode in Step S21. The first condition of the fourth motion mode is that the moving body 9 is detected within the predetermined area 10 around the robot 3. The special motion state in the fourth motion mode is that the robot 3 is operated at lower power than normal.

Next, in Step S22, the moving body detector 7 detects the position of the moving body 9 again. Next, in Step S23, the condition determination unit 16 carries out the condition determination for the second condition of the fourth motion mode. In other words, in Step S23, the condition determination unit 16 determines whether the moving body 9 is detected within the predetermined area 10 around the robot 3. If the moving body 9 is not detected within the predetermined area 10, the process advances to Step S24 where the motion mode switching unit 6 switches the motion mode of the robot 3 from the fourth motion mode to the first motion mode. If the condition of switching over to the first motion mode from the fourth motion mode (second condition of the fourth motion mode) is satisfied, the first condition of the first motion mode is not satisfied. Therefore, in the first motion mode, the robot 3 operates in the normal motion state. Even after the motion mode of the robot 3 is switched from the fourth motion mode to the first motion mode, the same condition determination as that for the first motion mode described above is performed. In other words, the switching over to the special motion state and to the fourth motion mode is performed as appropriate. For this reason, the safety of the robot system is improved further. In addition, the restriction on the power of the robot 3 is suppressed. This improves the productivity and rate of motion of the robot system. If the condition determination unit 16 detects the moving body 9 within the predetermined area 10 in Step S23, the process returns to Step S22 where the special motion state of the fourth motion mode is maintained. Then, the moving body detector 7 detects the position of the moving body 9.

Modified Example

Figure 5:
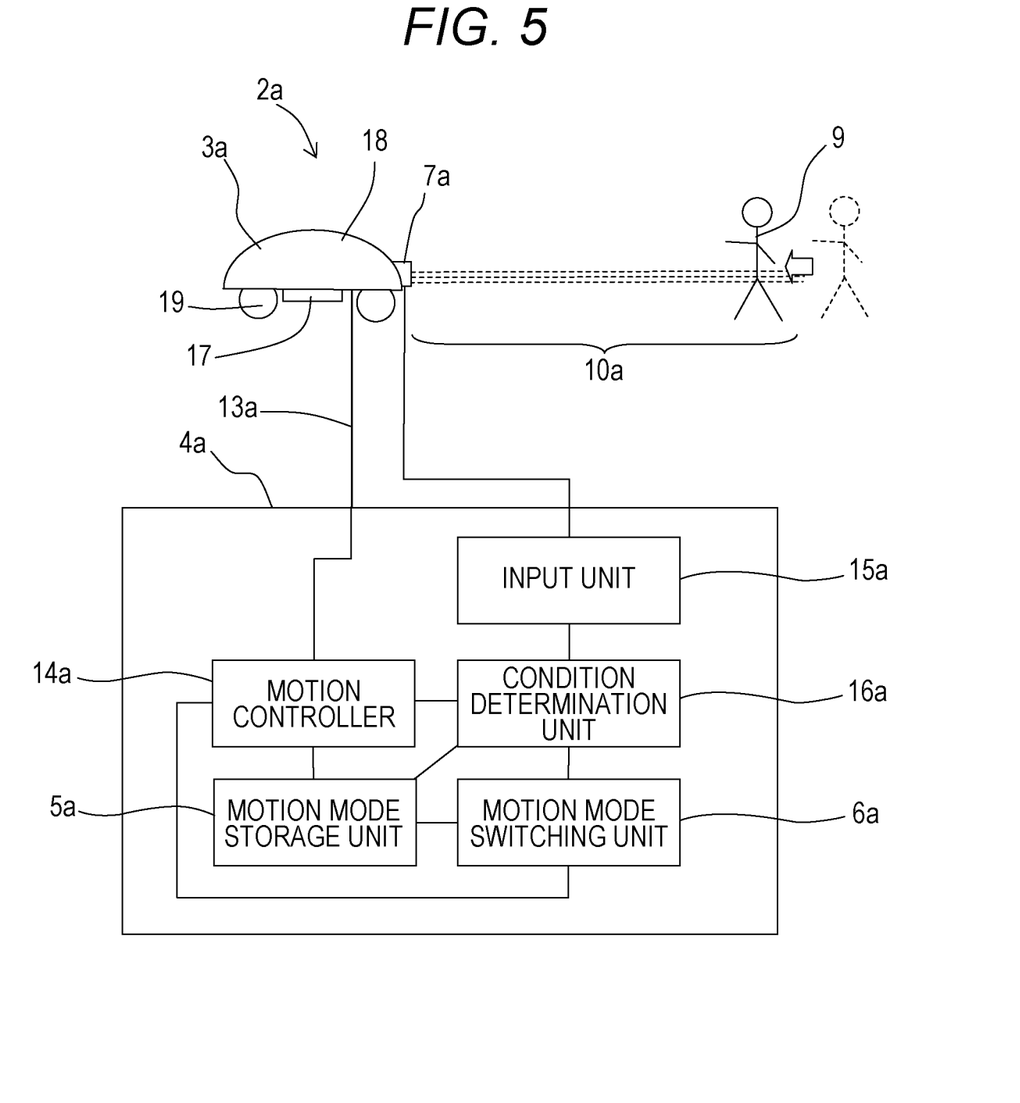
FIG. 5 is a schematic diagram illustrating an operation of a robot system according to a modified example.

FIG. 5 is a schematic diagram illustrating the operation of a robot system according to a modified example. A robot system 2a illustrated in FIG. 5 includes a robot 3a, a controller 4a for controlling the motion of the robot 3a, and a moving body detector 7a. The robot 3a is a self-running moving robot. The robot 3a includes a working unit 17 performing various kinds of works by running within a predetermined working area 10a, a base 18 having the working unit 17 mounted thereon, and a moving mechanism 19 for moving the base 18. The robot 3a works while running in the working area 10a according to a predetermined running method that is programmed in advance. The controller 4a includes a motion mode storage unit 5a, a motion mode switching unit 6a, a motion controller 14a, an input unit 15a, and a condition determination unit 16a. This controller 4a may further include a controller (not shown) for allowing the robot 3a to run by itself. The motion mode storage unit 5a stores a plurality of motion modes for controlling the robot 3a. In the case where the motion mode is executed, the motion state of the robot 3a is switched from the normal state to the special motion state if a predetermined first condition is satisfied. The motion mode switching unit 6a switches the motion mode to be executed. For example, it is assumed that a certain motion mode is executed and a first condition thereof is satisfied. In this case, the motion mode switching unit 6a switches the motion mode of the robot 3a to another motion mode if a predetermined second condition of this motion mode is satisfied. The motion controller 14a controls the robot 3a by executing the motion mode stored in the motion mode storage unit 5a. The condition determination unit 16a carries out the condition determination on whether the first condition and the second condition of the motion mode executed currently are satisfied or not. The input unit 15a receives various kinds of information used for the condition determination in the condition determination unit 16a, and outputs the information to the condition determination unit 16a.

The robot 3a as above runs by itself within the predetermined working area 10a. Therefore, the interference (contact) between the robot 3a and the moving body 9 easily happens. However, the safety is improved further by setting the first condition and the second condition in the plural motion modes and by switching the motion mode of the robot 3a when these conditions are satisfied.

As described above, in the robot system 2a according to the third embodiment, when the moving body 9 gets closer to the robot 3a working in the normal motion state, the robot 3a is stopped once. Then, when the moving body 9 goes away from the robot 3a within a predetermined period, the robot 3a restarts the operation in the same state. Meanwhile, if the state in which the moving body 9 is close to the robot 3a has continued for a predetermined period or more, the mode for operating the robot 3a at low power is executed and the robot 3a restarts the operation. As long as the robot 3a operates at low power, the contact between the robot 3a and the moving body 9 can suppress the impact on the moving body 9.

Then, when the moving body 9 goes away from the robot 3a after that, the robot 3a stops to operate at low power and restores to work in the normal state.

In other words, with the robot system 2a according to the third embodiment, the high productivity and high rate of operation, and high safety can be achieved at the same time.

Fourth Embodiment

A method for controlling the robot system according to a fourth embodiment is described below. The method for controlling the robot system according to the fourth embodiment is a method for controlling the robot system 2 according to the first embodiment illustrated in FIG. 1. The method for controlling the robot system according to the fourth embodiment includes a motion mode executing step and a motion mode switching step. In the motion mode executing step, the motion mode stored in the motion mode storage unit 5 is executed. The motion mode storage unit 5 stores the plural motion modes for controlling the robot 3. During the executing of the motion mode, when a predetermined first condition thereof is satisfied, the motion state of the robot 3 is switched from the normal motion state to the special motion state. In the motion mode switching step, the motion mode to be executed is switched. It is assumed that in the motion mode executing step, a particular motion mode is executed and a first condition of the particular motion mode is satisfied. In this case, when a predetermined second condition of this motion mode is satisfied, the motion mode switching unit 6 switches the motion mode of the robot 3 to another motion mode.

Here, on the basis of the flowchart illustrated in FIG. 2, the flow of the control in the method for controlling the robot system according to the fourth embodiment is described in the order of steps. In Step S1, first, the first motion mode is executed. The first condition of this first motion mode is that the moving body 9 is detected within the predetermined area 10 around the robot 3. The special motion state of this first motion mode corresponds to the state in which the robot 3 is stopped. The second condition of this first motion mode is that the state in which the moving body 9 is detected within the predetermined area 10 around the robot 3 has continued for a predetermined period or more.

Next, in Step S2, the moving body detector 7 detects the position of the moving body 9. The result of detecting the position of the moving body 9 is used for the condition determination for the first condition of the first motion mode and the condition determination for the second condition thereof. Next, in Step S3, the condition determination unit 16 determines whether the moving body 9 is detected within the predetermined area 10 around the robot 3. If the moving body 9 is detected within the predetermined area 10 around the robot 3, the process advances to Step S4 where the motion controller 14 stops the robot 3. Next, the process advances to Step S5 where the condition determination unit 16 carries out the condition determination for the second condition of the first motion mode. In other words, the condition determination unit 16 determines whether the state in which the moving body 9 is detected within the predetermined area 10 around the robot 3 has continued for a predetermined period or more. In other words, the moving body detector 7 checks (detects) the position of the moving body 9 at predetermined time intervals. The condition determination unit 16 measures (counts) the time for which the moving body 9 is present in the predetermined area 10. By comparing the measured time and the predetermined period, the condition determination unit 16 determines whether the second condition is satisfied or not. If the state in which the moving body 9 is detected has continued for the predetermined period or more, the motion mode switching unit 6 switches the motion mode of the robot 3 from the first motion mode to the fourth motion mode in Step S6. The first condition of the fourth motion mode is that the moving body 9 is detected within the predetermined area 10 around the robot 3. The special motion state of the fourth motion mode is that the robot 3 is operated at lower power than normal. During the condition determination for the second condition, the robot 3 remains in the stopped state. However, if the moving body 9 is no longer detected within the predetermined area 10 before the predetermined period has passed, the process returns to Step S1. Then, in Step S1, the motion controller 14 restarts the motion state of the first motion mode. According to the method for controlling the robot system according to the fourth embodiment as above, the safety of the robot system is improved. In other words, by setting the condition as above, the motion mode of the robot 3 is switched to another motion mode suitable for the robot 3 and the circumstances around the robot 3. This improves the safety further. Furthermore, since the restriction on the speed and motion of the robot 3 is suppressed, the takt time is reduced. As a result, the productivity and rate of motion of the robot system are improved.

The embodiments of the present disclosure have been described so far. The present disclosure is, however, not limited thereto. Various modifications and changes are possible within the range of the content. The motion mode storage unit 5 may store the plural motion modes for controlling the robot 3 so that the motion state of the robot 3 is switched from the normal state to the special state when the predetermined first condition is satisfied. When, while a particular motion mode of the plural motion modes stored in the motion mode storage unit 5 is in execution, the predetermined second condition is satisfied with the execution condition for the particular motion mode satisfied, the motion mode switching unit 6 may switch the motion mode to a motion mode different from the particular motion mode among the plural motion modes stored in the motion mode storage unit 5. The motion state of the robot 3 may be switched from the normal state to the special state when the predetermined first condition of each motion mode stored in the motion mode storage unit 5 is satisfied. The normal motion state herein described may be the motion state normally performed by the motion mode in execution when the first condition is not satisfied. The special motion state may be a motion state different from the motion state normally performed by the motion mode. The first condition and the special motion state switched when the first condition is satisfied may be different for each motion mode. For example, in at least one of the plural motion modes, the first condition may be that the moving body 9 is detected within the predetermined area around the robot 3 and when the first condition is satisfied, the motion state of the robot is switched from the normal state to the special motion state. When a particular motion mode is executed, the motion mode switching unit 6 may switch the particular motion mode to another motion mode stored in the motion mode storage unit 5. When the predetermined second condition of the particular motion mode is satisfied with the execution condition (first condition) of the particular motion mode satisfied, this motion mode switching unit 6 may switch the particular motion mode to another motion mode. In other words, in each motion mode, the first condition triggering the switching from the normal motion state to the special motion state and the second condition triggering the switching from the currently executed motion mode to another motion mode may be set in advance. Then, first, the condition determination unit 16 may determine whether the first condition and the second condition of the motion mode currently executed are satisfied or not based on the information of the robot 3 and the circumstances around the robot received from the input unit 15. If both the first condition and the second condition are satisfied, the motion mode switching unit 6 may select the motion mode that is different from the motion mode currently executed, from among the plural motion modes stored in the motion mode storage unit 5 and switch the motion mode of the robot 3.

The method for controlling the robot system may include the motion mode executing step and the motion mode switching step. The motion mode executing step may be the step of executing a predetermined motion mode from the motion mode storage unit storing the plural motion modes controlling the robot so that the motion state of the robot is switched from the normal state to the special motion state when the predetermined first condition is satisfied. The motion mode switching step may be the step of switching the motion mode to another motion mode when, while a particular motion mode is in execution by the motion mode executing step, the predetermined second condition is further satisfied with the execution condition (first condition) of the particular motion mode satisfied.

The robot system and the method for controlling the robot system according to the present disclosure may be any of the following first to twelfth robot systems and a first method for controlling the robot system.

A first robot system includes a robot and a controller configured to control a motion of the robot, and the controller includes: a motion mode storage unit storing a plurality of motion modes for controlling the robot so that a motion state of the robot is switched from a normal motion state to a special motion state when a predetermined first condition is satisfied; and a motion mode switching unit switching the motion mode of the robot to another motion mode when, while a particular motion mode stored in the motion mode storage unit is in execution, a predetermined second condition for the particular motion mode is satisfied with an executing condition for the particular motion mode satisfied.

A second robot system is the first robot system wherein the robot includes a working arm, a base configured to support the working arm, and a moving mechanism for moving the base.

A third robot system is the first or second robot system further including a moving body detector that detects a position of a moving body other than the robot, wherein the first condition of at least one of the plural motion modes is that the moving body is detected within a predetermined area around the robot, and when the first condition is satisfied, the motion state of the robot is switched from the normal motion state to the special motion state.

A fourth robot system is the third robot system wherein at least one of the plural motion modes is a first motion mode in which the first condition is that the moving body is detected within the predetermined area around the robot, and when the first condition is satisfied, the robot is switched to a stopped state.

A fifth robot system is any of the first to fourth robot systems wherein at least one of the plural motion modes is a second motion mode in which the first condition is that a switch provided for the robot is on, and when the first condition is satisfied, the robot is allowed to follow an external force.

A sixth robot system is any of the first to fifth robot systems further including a moving body detector that detects the position of the moving body other than the robot, wherein at least one of the plural motion modes is a third motion mode in which the first condition is that the distance between the robot and the position of the moving body detected by the moving body detector is less than or equal to a predetermined distance, and when the first condition is satisfied, the motion state of the robot is switched from the normal state to the special motion state.

A seventh robot system is any of the first to sixth robot systems further including a moving body detector that detects the position of the moving body other than the robot, wherein at least one of the plural motion modes is a fourth motion mode in which the first condition is that the moving body is detected within a predetermined area around the robot, and when the first condition is satisfied, the motion state of the robot is switched from the normal motion state to the special motion state in which the robot is operated at lower power than normal.

An eighth robot system is the fourth robot system wherein when the second condition of the first motion mode in which the state where the moving body is detected within the predetermined area around the robot has continued for a predetermined period or more is satisfied during the execution of the first motion mode, the motion mode switching unit switches the motion mode from the first motion mode to the fourth motion mode in which the first condition is that the moving body is detected within the predetermined area around the robot, and when the first condition of the fourth motion mode is satisfied, the motion state of the robot is switched from the normal state to the special motion state in which the robot is operated at lower power than normal.

A ninth robot system is the eighth robot system wherein when the second condition of the fourth motion mode in which the moving body is not detected within the predetermined area around the robot is satisfied during the execution of the fourth motion mode, the motion mode switching unit switches the motion mode from the fourth motion mode to the first motion mode.

A tenth robot system is the fourth robot system wherein when the second condition of the first motion mode in which the switch provided for the robot is on is satisfied during the execution of the first motion mode, the motion mode switching unit switches the motion mode from the first motion mode to the second motion mode in which the first condition is that the switch is on and when the first condition of the second motion mode is satisfied, the robot is allowed to follow an external force.

An eleventh robot system is the sixth robot system wherein when the second condition of the third motion mode in which the robot is stopped and the switch provided for the robot is on is satisfied during the execution of the third motion mode, the motion mode switching unit switches the motion mode from the third motion mode to the second motion mode in which the first condition is that the switch is on and when the first condition of the second motion mode is satisfied, the robot is allowed to follow an external force.

A twelfth robot system is the sixth robot system wherein when the second condition of the third motion mode in which the robot is in stopped state and the state in which the moving body is detected within the predetermined area around the robot has continued for a predetermined period or more is satisfied during the execution of the third motion mode, the motion mode switching unit switches the motion mode from the third motion mode to the fourth motion mode in which the first condition is that the moving body is detected within the predetermined area around the robot and when the first condition of the fourth motion mode is satisfied, the motion state of the robot is switched from the normal state to the special motion state where the robot is operated at lower power than normal.

A first method for controlling a robot system includes: a motion mode executing step of executing a predetermined motion mode from a motion mode storage unit storing a plurality of motion modes for controlling a robot when a predetermined first condition is satisfied, so that a motion state of the robot is switched from a normal motion state to a special motion state; and a motion mode switching step of switching the motion mode to another motion mode when, while a particular motion mode is in execution by the motion mode executing step, a predetermined second condition of the particular motion mode is satisfied with an execution condition for the particular motion mode satisfied.

The foregoing detailed description has been presented for the purposes of illustration and description. Many modifications and variations are possible in light of the above teaching.

It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot system comprising a robot and a controller configured to control motion of the robot, the controller comprising:
   a motion mode storage unit storing a plurality of motion modes for controlling the robot to switch a motion state of the robot, each motion mode of the plurality of motion modes having a normal motion state, a special motion state, a first condition that when satisfied switches the motion state of the robot from the normal motion state to the special motion state, and a second condition;
   a motion mode switching unit configured to switch the motion mode of the robot from a current motion mode to a different motion mode when both the first condition and the second condition of the current motion mode have been satisfied; and
   a moving body detector configured to detect a position of a moving body other than the robot,
   wherein the motion mode storage unit is configured to store a first motion mode, the first condition of the first motion mode is that the moving body is detected within a predetermined area around the robot, the special motion state of the first motion mode is in which the robot is stopped,
   wherein the second condition of the first motion mode is that the first condition of the first motion mode has continued for a predetermined period of time or more, the predetermined period of time being greater than zero,
   wherein the motion mode switching unit is configured to switch the motion mode of the robot from the first motion mode to another motion mode when the first condition and the second condition of the first motion mode have been satisfied during execution of the first motion mode,
   wherein the first condition of the another motion mode is that the moving body is detected within the predetermined area around the robot, and
   wherein the special motion state of the another motion mode is in which an operation of the robot is made at lower power than normal.

2. The robot system according to claim 1, wherein the robot includes a working arm, a base configured to support the working arm, and a moving mechanism for moving the base.

3. The robot system according to claim 1, wherein:
   the motion mode storage unit is configured to store an additional motion mode;
   the first condition of the additional motion mode is that a switch provided for the robot is on; and
   the special motion state of the additional motion mode is that the robot is allowed to follow an external force.

4. The robot system according to claim 1, wherein:
   the motion mode storage unit is configured to store an additional motion mode; and
   the first condition of the additional motion mode is that a distance between the robot and the position of the moving body detected by the moving body detector is less than or equal to a predetermined distance.

5. The robot system according to claim 1, wherein:
   the second condition of the another motion mode is that the moving body is not detected within the predetermined area around the robot; and
   after in the special motion state of the another motion mode, the motion mode switching unit is configured to switch the motion mode of the robot from the another motion mode to the first motion mode when the second condition of the another motion mode is satisfied during execution of the another motion mode.

6. The robot system according to claim 4, wherein:
   the second condition of the additional motion mode is that the robot is in a stopped state and a switch provided for the robot is on;
   the motion mode switching unit is configured to switch the motion mode of the robot from the additional motion mode to a further motion mode when the first condition and the second condition of the additional motion mode have been satisfied during execution of the additional motion mode;
   the first condition of the further motion mode is that the switch is on; and
   the special motion state of the further motion mode is that the robot is allowed to follow an external force.

7. The robot system according to claim 4, wherein:
   the second condition of the additional motion mode is that the robot is in a stopped state and the state in which the moving body is detected within the predetermined area around the robot has continued for the predetermined period of time or more; and
   the motion mode switching unit is configured to switch the motion mode of the robot from the additional motion mode to the another motion mode when the first condition and the second condition of the additional mode have been satisfied during execution of the additional motion mode.

8. A method for controlling a robot system, comprising:
   detecting a position of a moving body other than the robot,
   executing a first motion mode for controlling a robot when a first condition of the first motion mode is satisfied, so that a motion state of the robot is switched from a normal motion state to a special motion state in which the robot is stopped, the first condition of the first motion mode is that the moving body is detected within a predetermined area around the robot;
   switching the motion mode from the first motion mode to another motion mode when, while the first motion mode is in execution, a second condition of the first motion mode is satisfied in addition to the first condition of the first motion mode having been satisfied, the second condition of the first motion mode is that the first condition of the first motion mode has continued for a predetermined period of time or more, the predetermined period of time being greater than zero; and
   executing the another motion mode for controlling the robot when a first condition of the another motion mode is satisfied, so that the motion state of the robot is switched from the special motion state of the first motion mode to a special motion state of the another motion mode in which an operation of the robot is made at lower power than normal, the first condition of the another motion mode is that the moving body is detected within the predetermined area around the robot.

9. A robot system comprising a robot and a controller configured to control motion of the robot, the controller comprising:

a motion mode storage unit storing a plurality of motion modes for controlling the robot to switch a motion state of the robot, each motion mode of the plurality of motion modes having a normal motion state, a special motion state, a first condition that when satisfied switches the motion state of the robot from the normal motion state to the special motion state, and a second condition;

a motion mode switching unit configured to switch the motion mode of the robot from a current motion mode to a different motion mode when both the first condition and the second condition of the current motion mode have been satisfied; and a moving body detector configured to detect a position of a moving body other than the robot, wherein the plurality of motion modes includes a first motion mode having a special motion state in which the robot is stopped, a first condition in which the moving body is detected within a predetermined area around the robot, and a second condition in which the moving body is detected within the predetermined area continuously for a predetermined period of time or more, the predetermined period of time being greater than zero, wherein the plurality of motion modes includes another motion mode having a special motion state in which an operation of the robot is made at lower power than normal, and wherein, when the robot is in the special motion state of the first motion mode, the motion mode switching unit is configured to switch the motion mode of the robot from the first motion mode to the another motion mode when the second condition of the first motion mode is satisfied during execution of the first motion mode such that the robot switches from being stopped to the operation of the robot at lower power than normal.

* * * * *